(12) United States Patent
Todd

(10) Patent No.: US 6,571,808 B2
(45) Date of Patent: Jun. 3, 2003

(54) DISHWASHER

(75) Inventor: Robert William Todd, Dunedin (NZ)

(73) Assignee: Fisher & Paykel Limited, Auckland (NZ)

( * ) Notice: Subject to any disclaimer, the term of this patent is extended or adjusted under 35 U.S.C. 154(b) by 139 days.

(21) Appl. No.: 09/829,037

(22) Filed: Apr. 9, 2001

(65) Prior Publication Data

US 2001/0045226 A1 Nov. 29, 2001

(30) Foreign Application Priority Data

Apr. 10, 2000 (NZ) ................................................ 503866

(51) Int. Cl.$^7$ ............................................... A47L 15/42
(52) U.S. Cl. ...................... 134/58 D; 68/196; 134/200; 134/201; 220/211; 312/228; 312/270.3
(58) Field of Search ................................. 134/46, 56 D, 134/57 D, 58 D, 57 DL, 58 DL, 117, 200, 201; 68/196; 220/211; 312/228, 270.3

(56) References Cited

U.S. PATENT DOCUMENTS

| | | | | |
|---|---|---|---|---|
| 2,654,386 A | * | 10/1953 | Wotring | 134/117 X |
| 2,667,400 A | * | 1/1954 | Wotring | 312/270.3 X |
| 2,668,091 A | * | 2/1954 | Clark | 134/117 X |
| 2,836,186 A | * | 5/1958 | Guth | 68/196 X |
| 3,288,154 A | * | 11/1966 | Jacobs | 134/58 D |
| 4,526,020 A | * | 7/1985 | Fey et al. | |
| 5,755,244 A | * | 5/1998 | Sargeant et al. | 134/46 |
| 6,189,551 B1 | * | 2/2001 | Sargeant et al. | 68/196 X |

FOREIGN PATENT DOCUMENTS

| | | |
|---|---|---|
| WO | WO 9312706 | 7/1993 |
| WO | WO 9833426 | 8/1998 |

* cited by examiner

Primary Examiner—Philip R. Coe
(74) Attorney, Agent, or Firm—Trexler, Bushnell, Giangiorgi, Blackstone & Marr, Ltd.

(57) ABSTRACT

A washing appliance such as a dishwasher where a top-loading wash chamber is slidable out of cabinet for loading and unloading has a cabinet-mounted chamber lid which is power driven down onto the open top of the wash chamber during the washing cycle. Linear actuators or motors mounted in opposite sides of the appliance cabinet are coupled to opposite sides of the lid to pull the lid down when the chamber has been slid back into the cabinet. In a preferred embodiment rotating dc motors are used to rotate a threaded nut which in turn produces linear motion in a threaded shaft engaged within the nut and connected to the lid.

6 Claims, 4 Drawing Sheets

DISHWASHER

FIELD OF THE INVENTION

This invention relates to washing appliances and in particular wash chamber closure means. In particular, but not solely, the invention relates to dishwashers.

PRIOR ART

Dishwashers of the type described in WO 93/12706 and WO 98/33426 differ from conventional dishwashers in that a wash chamber and associated wash system is slidably mounted in the form of a drawer within a cabinet and the chamber is withdrawn horizontally to allow loading through the open top of the chamber. See present FIG. 1. A stacked two chamber single cabinet dishwasher as disclosed in WO 98/33426 is shown in FIG. 2. In dishwashers of this type where the wash chambers 4 are mounted as sliding drawers, the closing of the open top chambers prior to commencement of the wash cycle is more complicated than with conventional front loading or above-bench top-loading machines. It is undesirable to have users manually close a door to seal the open-topped wash chamber prior to pushing the extended 'drawer' back into the cabinet 2. It is preferable to have a closure 1 which is actuated by the action of retracting the wash chamber back into the cabinet. A wash chamber closure is held within the cabinet and when the chamber is retracted the closure sealably closes off the top of the chamber to contain wash liquid in operation. In WO 93/12706 the wash chamber closure is a lid of rigid unitary construction movably retained in the top of the cabinet and engaged by the wash chamber on retraction to be mechanically moved down onto the top of the wash chamber. A parallelogram linkage and cam mechanism can be employed to achieve this. In practice it has been found that other types of wash chamber closures may be satisfactory and may have better production economics.

A range of other such alternative closures is disclosed in WO 98/33426, including a rigid lid fixed in relation to the cabinet with an inflatable gasket attached Hereto being used to seal the lid to the wash chamber rim. The inflation device used to seal between the lid and wash chamber requires additional head space above the lid. This can be a consideration when two vertically stacked drawers are required to fit under a standard kitchen bench unit. Furthermore, the inflatable gasket may be ruptured by sharp objects, such as knives, that may be put into the dishwasher.

SUMMARY OF THE INVENTION

It is an object of the present invention to provide a dishwasher having a wash chamber closure which at least goes some way towards overcoming the abovementioned disadvantages or which will provide a further useful alternative.

Accordingly the invention consists in a washing appliance comprising:

a cabinet, a wash system slidably mounted within said cabinet in such a manner that it may be withdrawn horizontally out of said cabinet for access thereto, said wash system including:

an open top wash chamber adapted to accommodate items to be washed, said wash chamber having a top peripheral rim, a wash chamber closure mounted in the top of said cabinet, which closure covers the open top of said wash chamber on retraction of the wash chamber into said cabinet, said closure being mounted in a horizontal plane in the top of said cabinet with a predetermined freedom of movement in the vertical direction, at least one motor adapted to provide a linear reciprocating motion, linkage means attached to said closure and connected to said at least one motor, the motor and linkage means raising and lowering said closure in a vertical motion between a first position where the closure is in sealing engagement with said wash chamber rim and a second position where the closure is vertically spaced from the top of said wash chamber rim.

DESCRIPTION OF THE PREFERRED EMBODIMENT

Figure 1:
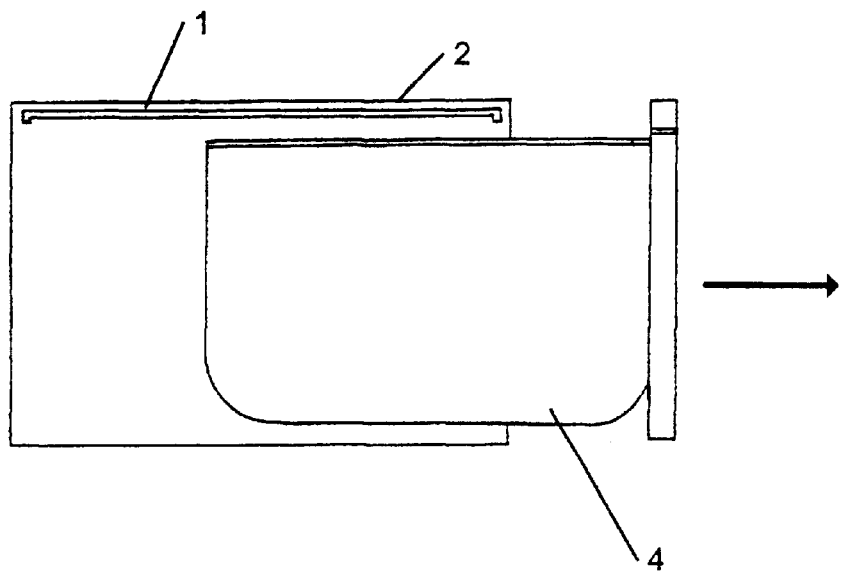
FIG. 1 is a diagrammatic longitudinal cross-section of a dishwasher of the type to which the present invention relates.
Figure 5:
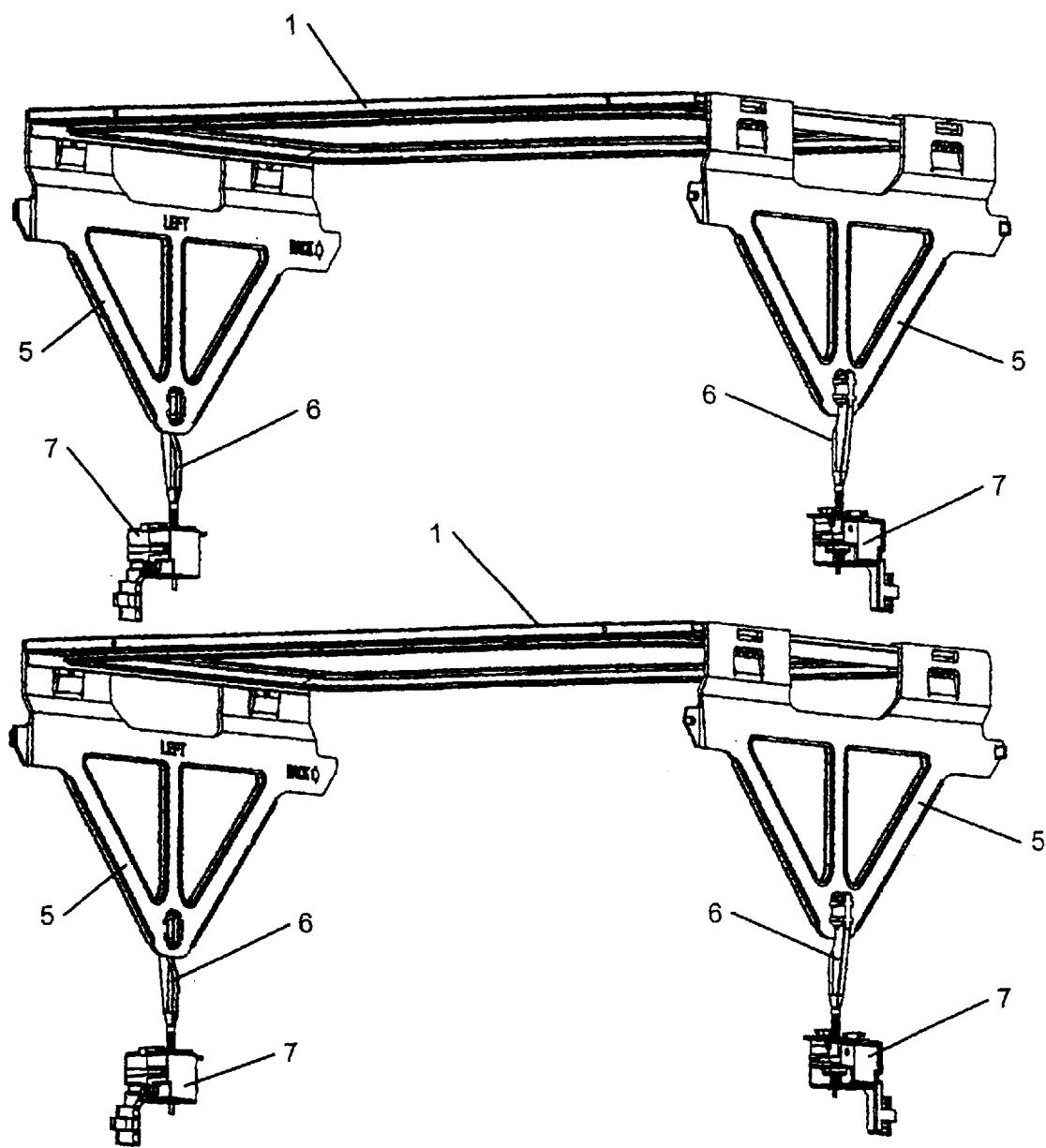
FIG. 5 is a perspective view of the wash chamber closure device, showing two complete closure devices in conjunction with one another as used in a stacked dishwasher arrangement.

One side of the interior of a cabinet for a dishwasher of the type shown in FIG. 5 employing the present invention is shown in FIG. 1. Cabinet 2 has slide rails 8 mounted in a side wall 18 which slidably support a wash chamber (not shown). Identical slide rails are provided on the opposite side wall of the cabinet. A chamber lid 1 is mounted in the top of cabinet 2 and supported at each side edge by yoke members 5 which are located adjacent each side wall 18 (see FIG. 5). Lid 1 is formed from a stainless steel pressed part, and provided with a groove seal 3, extruded from elastomer, to provide sealing between the lid 1 and the wash chamber 4.

In the present invention the lid 1 is moved up and down by two linear motors, each connected to a respective yoke member. In the preferred embodiment rotating electric motors are used to drive a "nut" on a lead screw through a worm gear to achieve linear motion. Other powered linear actuators could be used, such as pneumatic rams or linear electric motors.

Each yoke member 5 is connected at the bottom to a link 6. In the preferred embodiment the lower end of link 6 takes the form of a threaded rod. When assembled this is engaged within a rotatable "nut" driven by an electric motor. The complete motor actuator assembly 7 is mounted beneath the slides 8.

Figure 4:
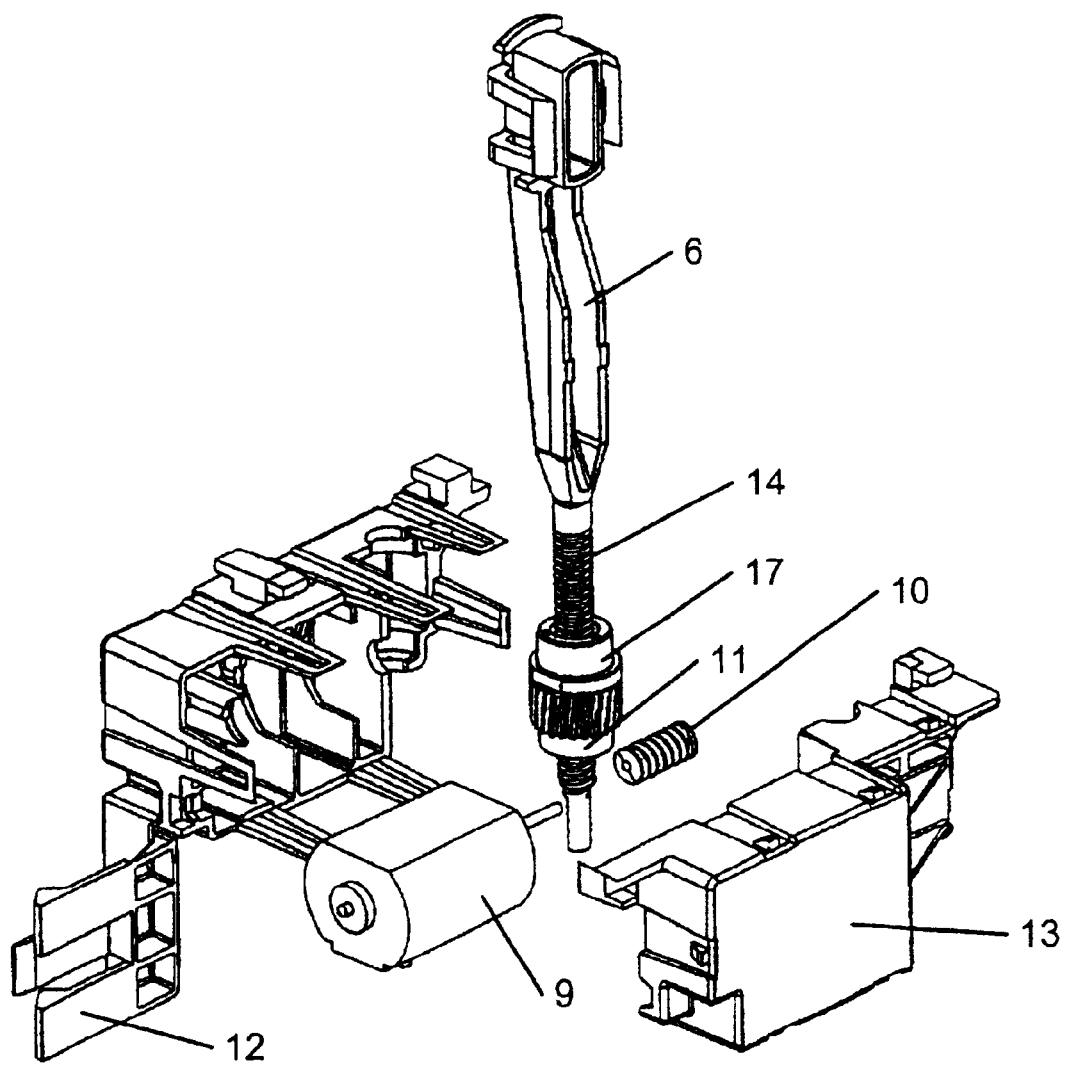
FIG. 4 is an exploded isometric view of the motor used in the wash chamber closure device.

The actuator assembly is shown in FIG. 4 and consists of a small DC electric motor 9, a worm gear 10 mounted on the motor drive shaft and a pinion gear 11 formed on the outer surface of the nut 17 which is engaged with the worm gear. These components are mounted within a chassis 12 and complementary cover 13. Each actuator is attached to the underside of a respective slide rail on cabinet side wall 18.

Rotation of a motor 9 will rotate worm 10 which will rotate pinion 11 and thus nut 17. Because the actuator assembly is fixed to the cabinet, rotation of the nut 17 means that link 6 must move axially up or down (depending on direction of rotation) because threaded portion 14 is engaged within the nut 17. For a two wash chamber single cabinet dishwasher of the type shown in FIG. 2, two lids 1 are required, each in registration with the top of a respective stacked wash chamber. In the preferred embodiment each lid has dedicated actuators 5 as shown in FIG. 5.

Figure 2:
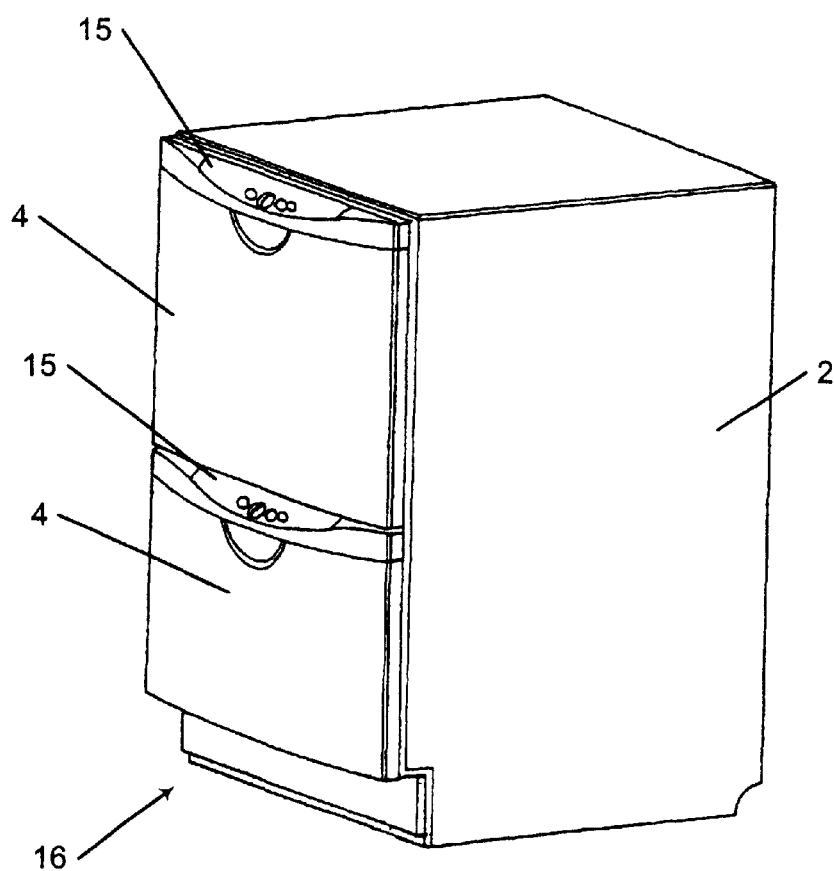
FIG. 2 is a pictorial view of a two chamber single cabinet dishwasher of the type to which the present invention relates.
Figure 3:
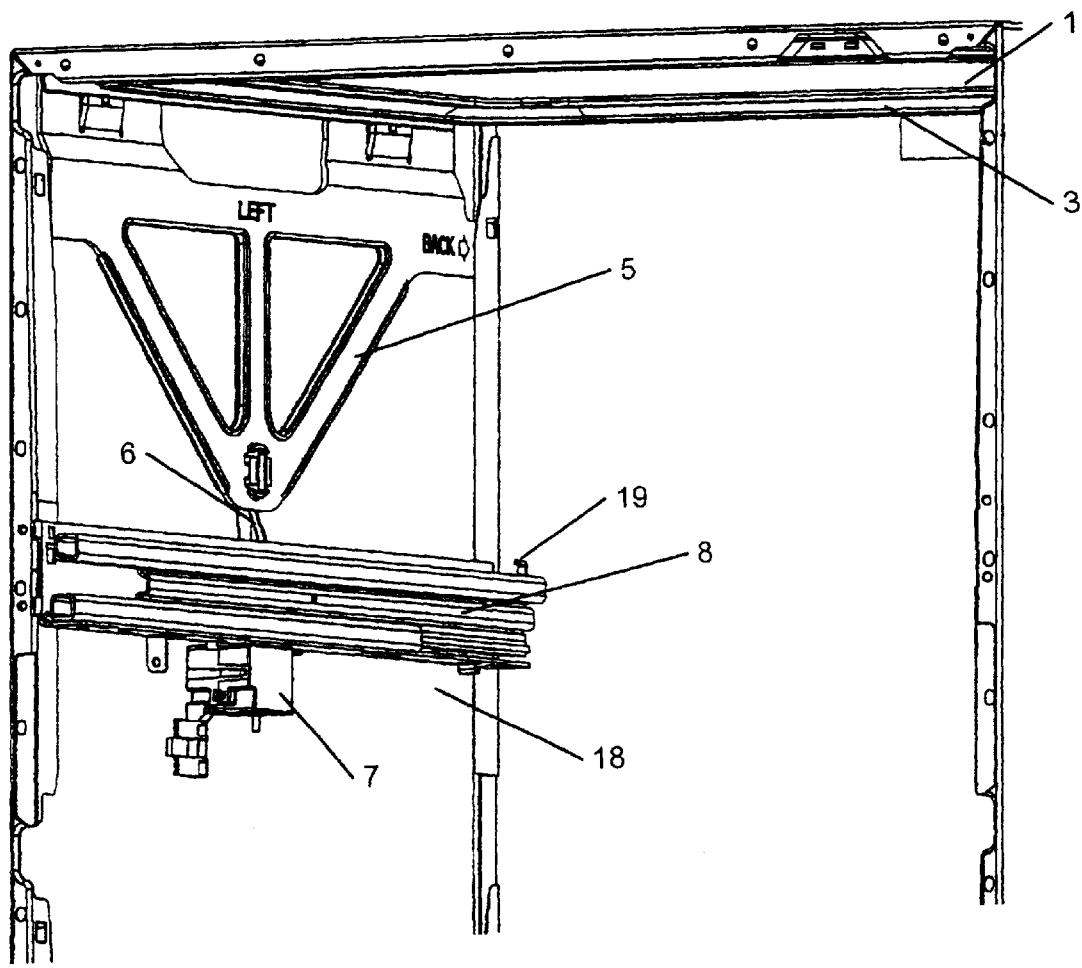
FIG. 3 is a partial view of the inside of a dishwasher cabinet, showing in particular one side of a wash chamber closure device, in a stacked dishwasher arrangement.

The electric motors 7 are engaged in the appropriate direction of rotation by a conventional controller preferably a programmed microprocessor) in response to cycles initiated by users' inputs through push button control 15 (FIG. 2).

In use, when a wash chamber 4 is loaded with dishes and fully retracted within the cabinet 2 and the dishwasher powered on by the user, motors 9 controlling at least one lid are powered on by the dishwasher controller with a voltage polarity to rotate worm gear 10, pinion gear 11, and nut 17 in a direction such that the lead screw 14 of link 6 is moved in a vertically downward motion. This vertical motion is transmitted to lid 1 via the yoke 5 and the lid is lowered and seal 3 meets with the rim of wash chamber 4 with the actuator providing a clamping force on the seal between the lid and wash chamber.

A transducer 19 that detects whether the wash chamber in the closed position provides input to the controller to ensure the lid is not closed if the chamber is partially or wholly withdrawn.

If the user wishes to interrupt the wash cycle they must activate a power off or pause button in controls 15 to cause the controller to reverse the motor rotation direction which causes the gears to move in reverse, thereby raising the lid from the wash chamber rim. Lid position detection means are mounted in the cabinet adjacent a sensing part on either the lid or the linkage 5, 6 to detect that the lid is in the open position and logically enable the controller to release a chamber lock to enable the chamber to be withdrawn from the cabinet.

During closure of the lid the motors 9 run until the load on the motors increase due to the clamping of the lid on the wash chamber rim, which causes the motor currents to increase. This increase in current is detected by the controller which then shuts off power to the motors.

The advantages of this arrangement above prior dishwasher lid closures, are that the present invention is mechanically simple, using few parts, therefore there is less possibility of mechanical breakdown. Furthermore, the actuation in closing the lid is fast and enables ease of interruption at any point in the wash cycle. With appropriate control of the motors in response to wash chamber position detection means the lid and sealing gasket is only moved into engagement with the wash chamber rim when the wash chamber is fully retracted and stationary. This eliminates wear in the gasket seal which would occur if the seal was to engage with the wash chamber rim while it was still moving.

What is claimed is:

1. A washing appliance comprising:

a cabinet, a wash system slidably mounted within said cabinet in such a manner that it may be withdrawn horizontally out of said cabinet for access thereto, said wash system including:

an open top wash chamber adapted to accommodate items to be washed, said wash chamber having a top peripheral rim, a wash chamber closure mounted in the top of said cabinet, which closure covers the open top of said wash chamber on retraction of the wash chamber into said cabinet, said closure being mounted in a horizontal plane in the top of said cabinet with a predetermined freedom of movement in the vertical direction, at least one motor adapted to provide a linear reciprocating motion, linkage means attached to said closure and connected to said at least one motor, the motor and linkage means raising and lowering said closure in a vertical motion between a first position where the closure is in sealing engagement with said wash chamber rim and a second position where the closure is vertically spaced from the top of said wash chamber rim.

2. A washing appliance according to claim 1 including a wash cycle controller, wherein said at least one motor is energised by said controller.

3. A washing appliance according to claim 1 wherein said motor comprises an electrical rotating machine coupled to a rotational to linear motion gear box, the output of which is connected to said linkage means.

4. A washing appliance according to claim 3 wherein said gear box has a driven internally threaded gear wheel, and said linkage means includes a threaded portion which engages within said internally threaded gear wheel.

5. A washing appliance according to claim 1 wherein there are two motors mounted at opposite sides of said cabinet and said linkage means comprises two substantially vertical members located on each side of said wash chamber and fastened at the top end to said closure and at respective lower ends to a corresponding motor.

6. A washing appliance according to claim 1 including a second wash system, closure, at least one motor and linkage means as recited in claim 1 mounted within said cabinet below the wash system recited in claim 1.

\* \* \* \* \*

UNITED STATES PATENT AND TRADEMARK OFFICE
CERTIFICATE OF CORRECTION

PATENT NO.    : 6,571,808 B2
DATED         : June 3, 2003
INVENTOR(S)   : Robert William Todd It is certified that error appears in the above-identified patent and that said Letters Patent is hereby corrected as shown below:

<u>Column 2,</u>
Lines 55-56, "to a link 6.  In the" should be -- to a link 6.  The lower end of link 6.  In the --

<u>Column 3,</u>
Line 12, "preferably" should be -- (preferably --

Signed and Sealed this

Twenty-first Day of October, 2003

JAMES E. ROGAN
*Director of the United States Patent and Trademark Office*